US012627092B2

(12) United States Patent
Brandt et al.

(10) Patent No.: US 12,627,092 B2
(45) Date of Patent: May 12, 2026

(54) STAGED MATING ELECTRICAL CONNECTOR

(71) Applicants: TE Connectivity Solutions GmbH, Schaffhausen (CH); TE Connectivity Germany GmbH, Bensheim (DE)

(72) Inventors: Christian Perry Brandt, Middleton, PA (US); John W. Hall, Middleton, PA (US); Guenther Mumper, Bensheim (DE)

(73) Assignee: TE Connectivity Solutions GmbH (CH)

( * ) Notice: Subject to any disclaimer, the term of this patent is extended or adjusted under 35 U.S.C. 154(b) by 903 days.

(21) Appl. No.: 17/941,108

(22) Filed: Sep. 9, 2022

(65) Prior Publication Data

US 2023/0086860 A1 Mar. 23, 2023

Related U.S. Application Data

(60) Provisional application No. 63/247,742, filed on Sep. 23, 2021.

(51) Int. Cl.
*H01R 13/514* (2006.01)

(52) U.S. Cl.
CPC .................................. *H01R 13/514* (2013.01)

(58) Field of Classification Search
CPC .................................................... H01R 13/514
See application file for complete search history.

(56) References Cited

U.S. PATENT DOCUMENTS 5,174,787 A * 12/1992 Shirai .................. H01R 13/641 439/924.1
5,472,357 A * 12/1995 Yamanashi ........ H01R 13/6273 439/924.1
5,727,969 A * 3/1998 Yamanashi ........ H01R 13/6273 439/594
5,775,953 A * 7/1998 Yamanashi .......... H01R 13/506 439/701
7,438,570 B2 * 10/2008 Mori ................ H01R 13/62933 439/157
7,641,499 B1 * 1/2010 George ................. B60L 3/0069 439/352
8,696,373 B2 * 4/2014 Yagome ........... H01R 13/62944 439/924.1
8,998,653 B2 * 4/2015 Kamiya ............... H01R 13/627 439/701

* cited by examiner

*Primary Examiner* — Neil Abrams

(57) ABSTRACT

A connector comprises a first housing and a second housing each receiving a plurality of electrical terminals. The second housing is connected to the first housing, and is movable relative thereto in an insertion direction of the connector with respect to a mating connector. A latch selectively fixes the first housing in a staggered position relative to the second housing in the insertion direction. As the connectors are joined to a mating connector, a protrusion on the mating connector engages and opens the latch to permit relative movement of the first and second housing.

19 Claims, 10 Drawing Sheets

STAGED MATING ELECTRICAL CONNECTOR

CROSS-REFERENCE TO RELATED APPLICATIONS

This application claims priority under 35 U.S.C. § 119 to U.S. Provisional Patent Application No. 63/247,742, filed on Sep. 23, 2021.

FIELD OF THE INVENTION

The present disclosure relates to electrical devices, and more particularly, to an electrical connector.

BACKGROUND

Electronic components, such as sensor assemblies, are often housed or packaged separately from a remainder of a larger electrical system in which they are utilized, promoting ease of integration and improved protection of sensitive components from harsh environmental conditions. Accordingly, in use, these components must be electrically interconnected with other elements of the system. These connections are often realized by cables joining various components via complementary electrical connectors. In addition to electrical performance, connectors may also be required to meet other standards, such as mating force limitations, promoting ease of installation and/or assembly. As systems increase in complexity and/or consolidate interconnections through fewer connectors, the number of mating terminals of these connectors increase. However, increasing the number of mating terminals of a connector increases the mating force required to fully engaged corresponding connector pairs. Likewise, the use of larger terminals in order to increase power handling requirements, or the presence of built-in terminal protection features, may also raise a connector's mating force. One or more of these scenarios may result in a connector exceeding a maximum mating force requirement.

Accordingly, improved connectors are desired which minimize the force required to mate the connector, thus allowing an increase in the number and/or size of the terminals being mated.

SUMMARY

According to an embodiment of the present disclosure, an electrical connector comprises a first housing and a second housing each receiving a plurality of electrical terminals. The second housing is connected to the first housing, and is movable relative thereto in an insertion direction of the connector with respect to a mating connector. A latch selectively fixes the first housing in a staggered position relative to the second housing in the insertion direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
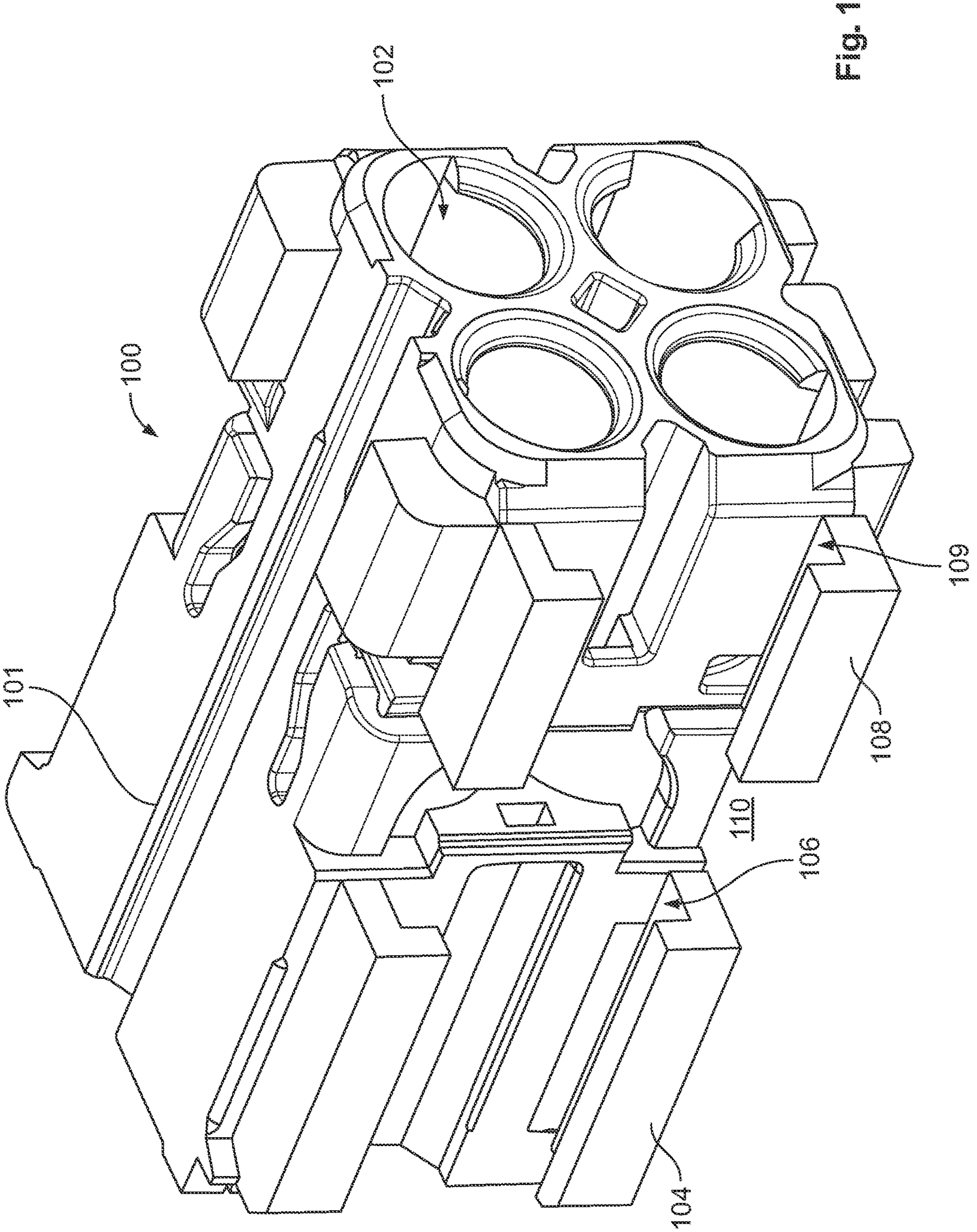
FIG. 1 is a perspective view of a first connector housing of an electrical connector according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include connectors and connector assemblies which reduce mating forces by staggering a mating sequence of the connector terminals. In one embodiment, a connector of a connector assembly is split into two housings, or housing halves, which are joined side-by-side in a slidable manner. A latch is provided to fix the two housing halves in a staggered orientation along a mating or insertion direction of the connector with a mating connector. Once the forward or lead housing half is engaged with the mating connector (i.e., its terminals are engaged or at least partially engaged with those of the mating connector), the latch is released, such as by a camming operation acting thereon. With the latch released, the second housing half is freed to be inserted into the mating connector. As a user is substantially engaging only one-half of the connector's terminals at any given time, the insertion force required is greatly reduced. By way of example, in the case of an 8 pin (or 8 terminal) connector, this staggered operation permits the engagement of 4 of the pins prior to the engagement of the remaining 4 pins. This arrangement effectively halves the required mating force of the connector at any given time. More specifically, a peak mating force is split into two separate 4 terminal mating events instead of one 8 terminal mating event.

Figure 2:
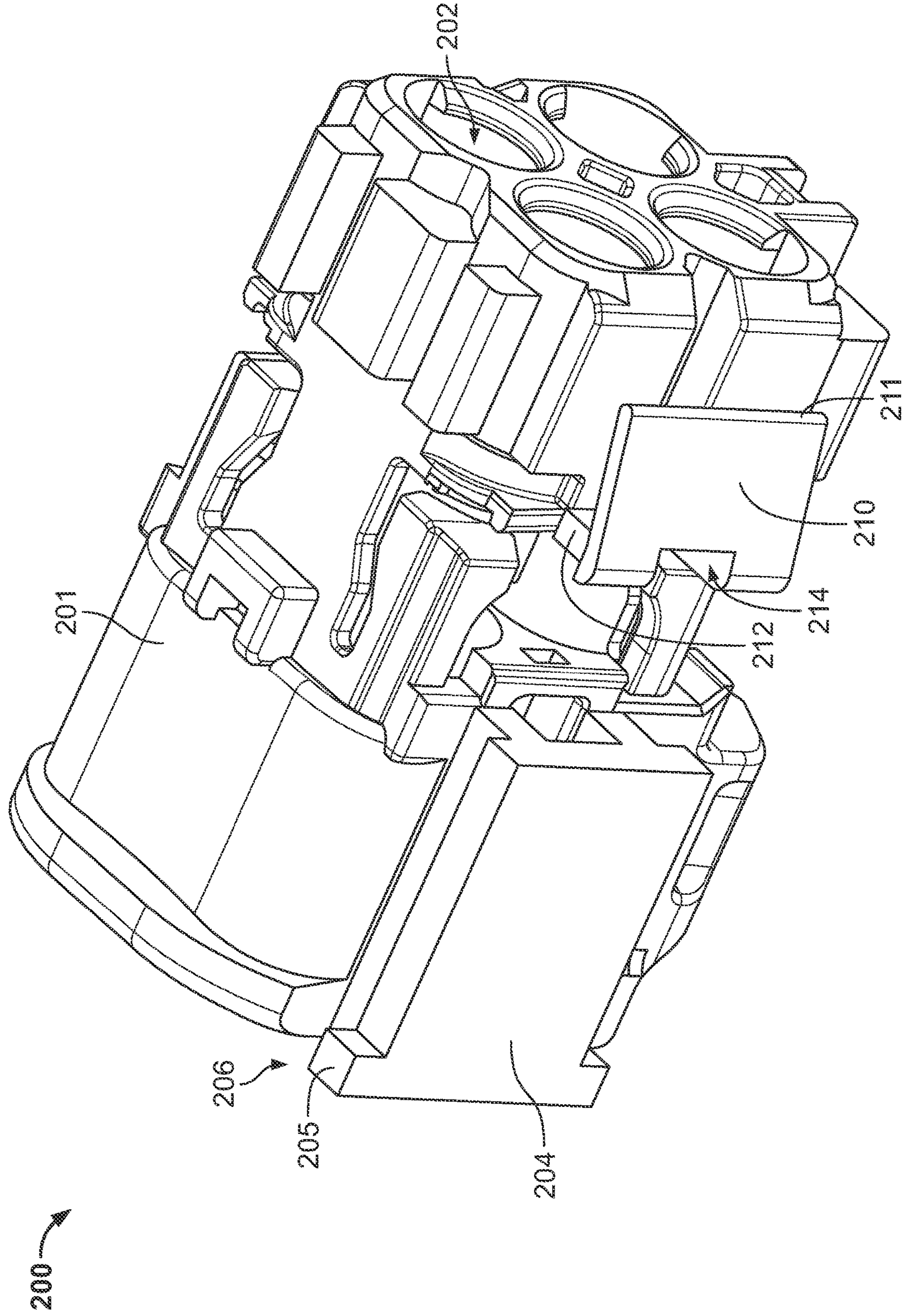
FIG. 2 is a perspective view of a second connector housing of the electrical connector according to an embodiment of the present disclosure.

FIGS. 1 and 2 illustrate first and second connector housings, or housing halve 100,200, respectively according to a first embodiment of the present disclosure. Together, the housings 100,200 form a complete housing or connector 20 (see FIG. 3) to be coupled with a mating connector (e.g., connector 300 of FIG. 4). In the exemplary embodiment, each housing 100,200 is adapted to hold four terminals for forming an 8 terminal connector, however, other numbers of terminals are possible without departing from the scope of the present disclosure.

As shown in FIG. 1, the first housing 100 includes a body 101, for example, a molded polymer body. A plurality (i.e., 4) terminal openings 102 are formed through the body 101 and are adapted to receive a corresponding number of conductive terminals (111, see FIG. 3). The body 101 further defines opposing flanges 104 forming opposing slots 106. The flanges 104 and associated slots 106 are defined generally on a rear portion of the body 101 relative to a front or insertion end, however, their placement can be varied. The slots 106 extend in a mating or an insertion direction I (see FIG. 6) of the housing 320 relative to the mating connector 300. In the exemplar embodiment, each flange 104 is generally L-shaped and extends from a sidewall of the body 101, although other configurations are possible without departing from the scope of the present disclosure. A second pair of opposing flanges 108 (e.g., L-shaped flanges) are defined by the body 101 proximate the front end thereof, by way of example. The flanges 108 define corresponding slots 109 extending in the insertion direction I. A gap or space 110 is defined between the flanges 104 and the flanges 108 in the insertion direction I. As will be set forth in greater detail, the space 110 is provided to accommodate a latching feature of the second housing 200.

As shown in FIG. 2, like the first housing 100, the second housing 200 includes a body 201, for example, a molded polymer body. A plurality (i.e., 4) terminal openings 202 are formed through the body 201 and are adapted to receive a corresponding number of conductive terminals (211, see FIG. 3). The second housing 200 is adapted to be slidably connected to the first housing 100 via corresponding engaging features. Specifically, the body 201 defines a protrusion 204 having a generally T-shaped cross-section. The protrusion 204 defines recesses or slots 206 on either side thereof which are adapted to slidable receive the free ends of the flanges 104 of the first housing 100. Likewise, the protrusion 204 is received within the slots 106 of the body 101 of the first housing 100. In this way, the protrusion 204 and flanges 104 define a sliding tongue and groove or "T-Slot" type interface. This engagement is shown, for example, in FIG. 5. Other similar interfaces, such as "dovetail" type shapes may also be used. The engagement of the protrusion 204 within the slots 106 permits relative movement between the housings 100,200 in either direction along an axis parallel to the insertion direction I, but restrains the housings 100,200 from other directions of relative movement (e.g., all other directions). The protrusion 204 further defines extending end portions 205 acting as mechanical stops, limiting the relative movement between the housing 100,200 in one direction.

Still referring to FIG. 2, the second body 201 includes a latch embodied as an elastic arm or flap 210. The latch or elastic arm 210 includes a first end 212 fix to or formed integrally with the body 201, and a second free end 211. In the exemplary embodiment, the free end 211 extends toward the front of the body 201, as well as obliquely relative to the insertion direction. The latch 210 further defines an opening 214 extending therethrough generally in the insertion direction. As will be set forth in greater detail herein, the opening 214 is provided to accommodate a latch release element or cam during a mating operation of the connector 20.

Figure 3:
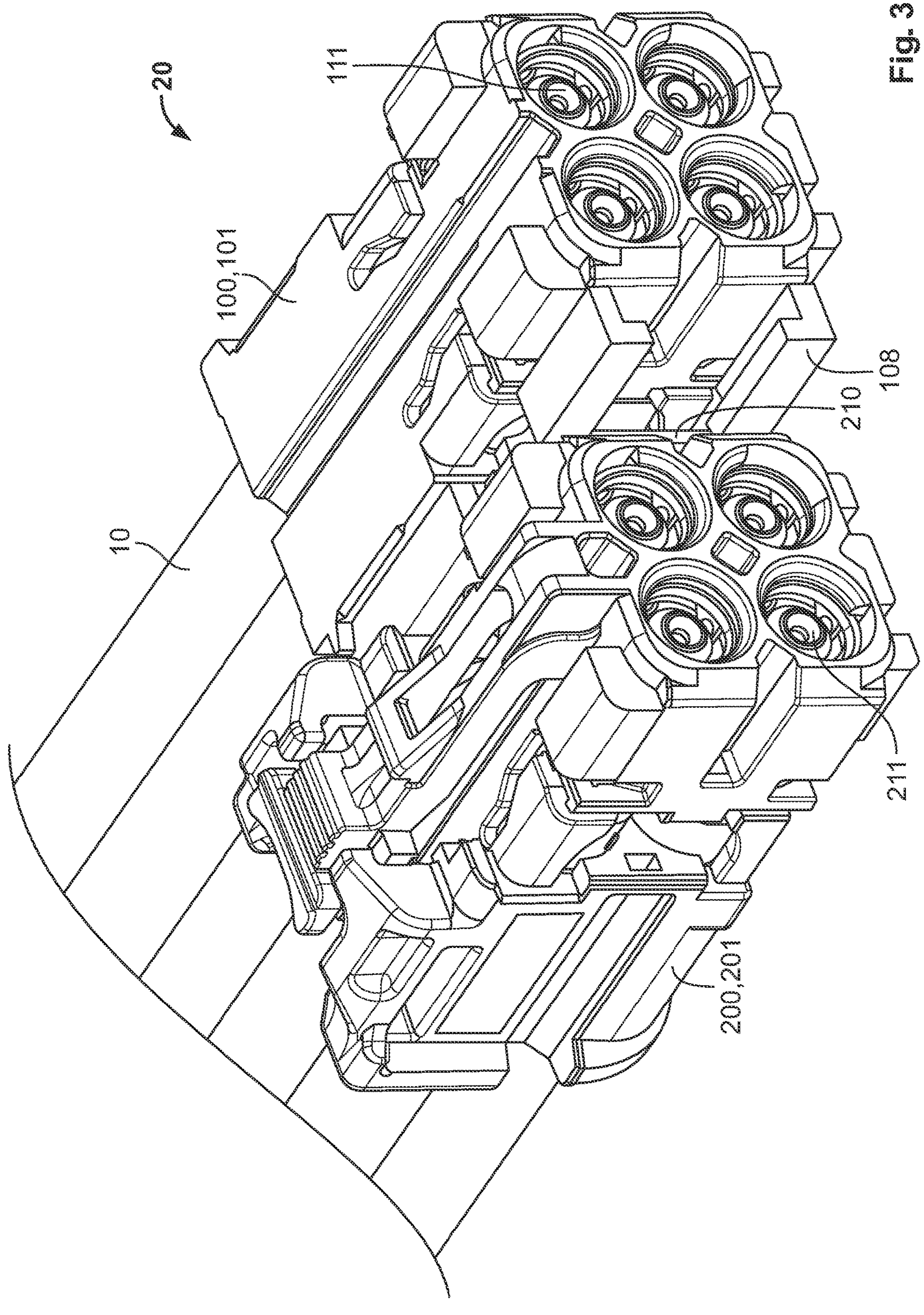
FIG. 3 is a front perspective view of the first and second connector housings of FIGS. 1 and 2 in a staggered initial mating position.
Figure 5:
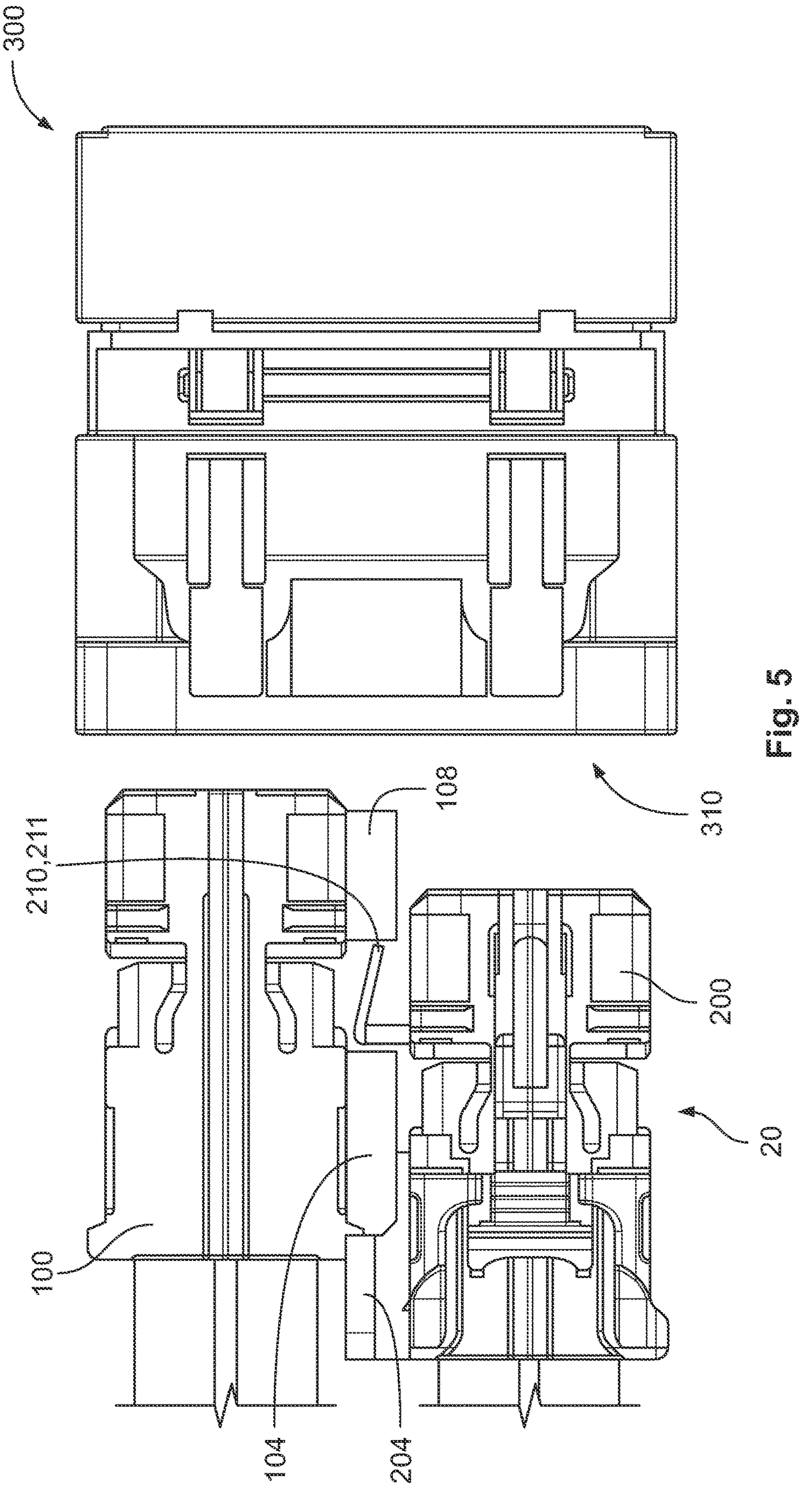
FIG. 5 is a top view of the electrical connector of FIG. 3 aligned for mating with the mating connector of FIG. 4.
Figure 10:
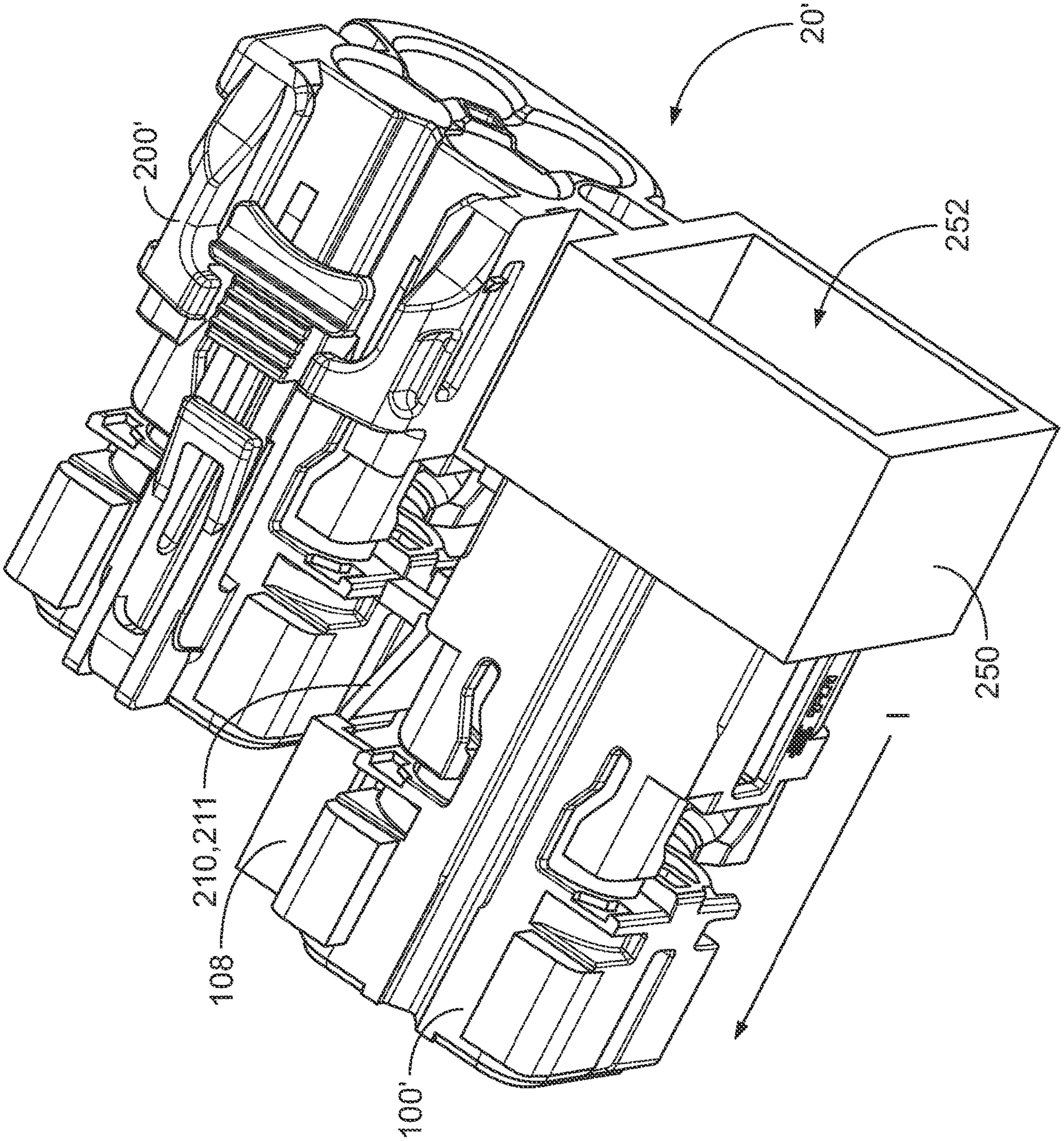
FIG. 10 is a perspective view of an electrical connector according to another embodiment of the present disclosure.

As can be seen in FIGS. 3 and 5, the housings 100,200 are engaged with one another and fixed in an initial insertion or staggered position to form the connector 20. Specifically, the first and second housings 100,200 are mated via the complementary flanges 104 and the protrusion 204 to form the connector 20. In the illustrated initial position, the latch 210 is arranged within the opening 110 formed between the pairs of opposing flanges 104,108 of the first housing 100. Due to the oblique orientation of the latch 210, the free end 211 thereof directly opposes or abuts the rearward-facing and inwardly-extending portions of the flanges 108 in the insertion direction I. See also FIG. 10 showing this arrangement. In this way, with the latch 210 in the initial locked or staggered position shown in FIGS. 3 and 5, the second housing 200 cannot be advanced relative to the first housing 100 in the insertion direction I. As shown in FIG. 3, a plurality of wires 10 are inserted into the rear of each housing 100,200. The wires 10 are electrically connected to corresponding terminals 111,211 arranged within the receptacles or terminal openings 102,202 (see FIGS. 1 and 2).

Figure 4:
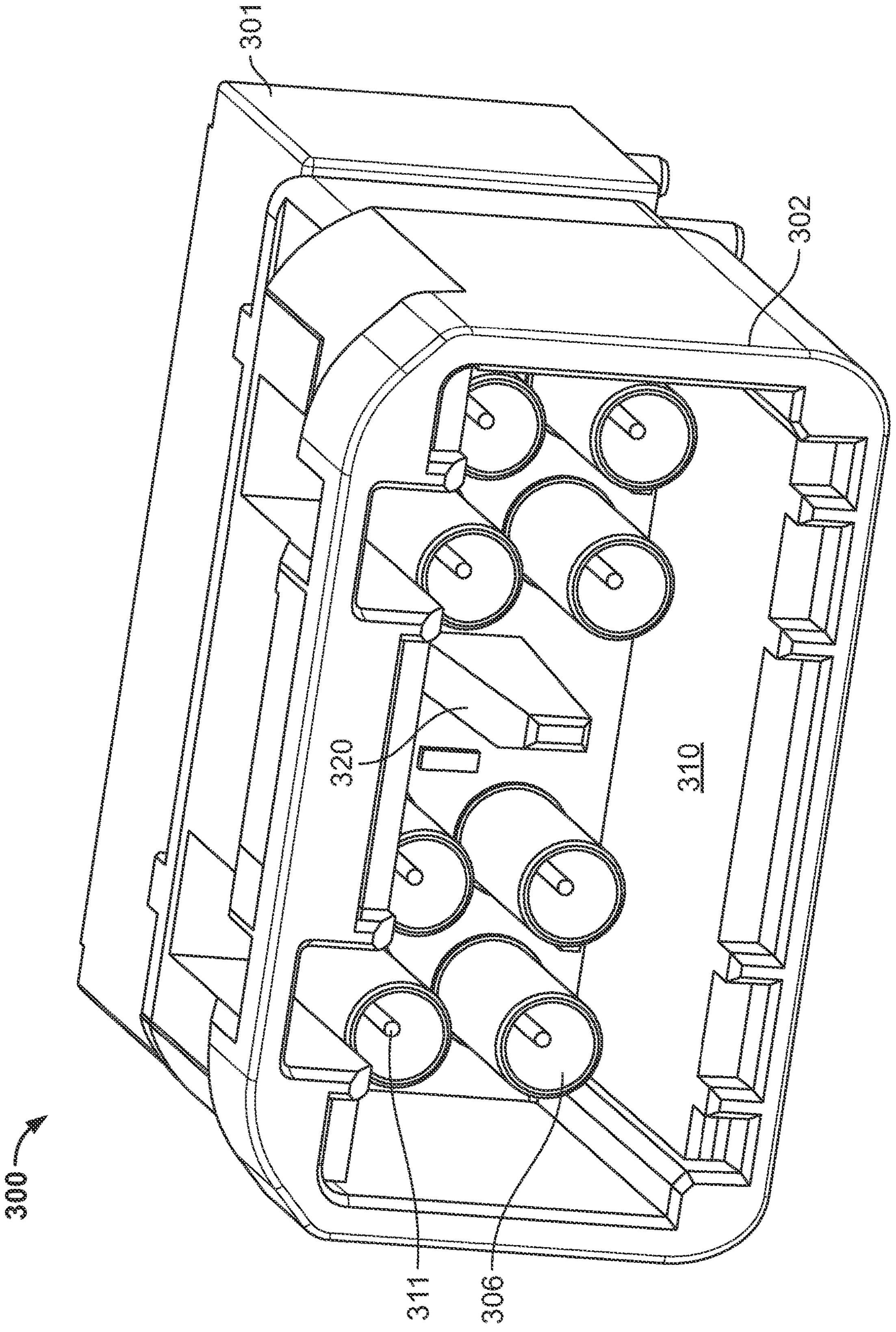
FIG. 4 is a front perspective view of a mating connector adapted to engage with the electrical connector of FIG. 3.

Referring now to FIG. 4, the exemplary mating connector 300 comprises a two-part body including a rear part 301 and a front part 302. Receptacles 306 are defined by the rear body 301 and extend though corresponding openings formed through the front part 302 into a receiving space or socket 310. Corresponding conductive terminal pins 311 are arranged in each receptacle 306. The front body 302 defines a release element or protrusion 320 extending opposite the insertion direction of the connector 20, and generally from a rear of the front part 302 toward an open end of the receiving space 310.

Figure 6:
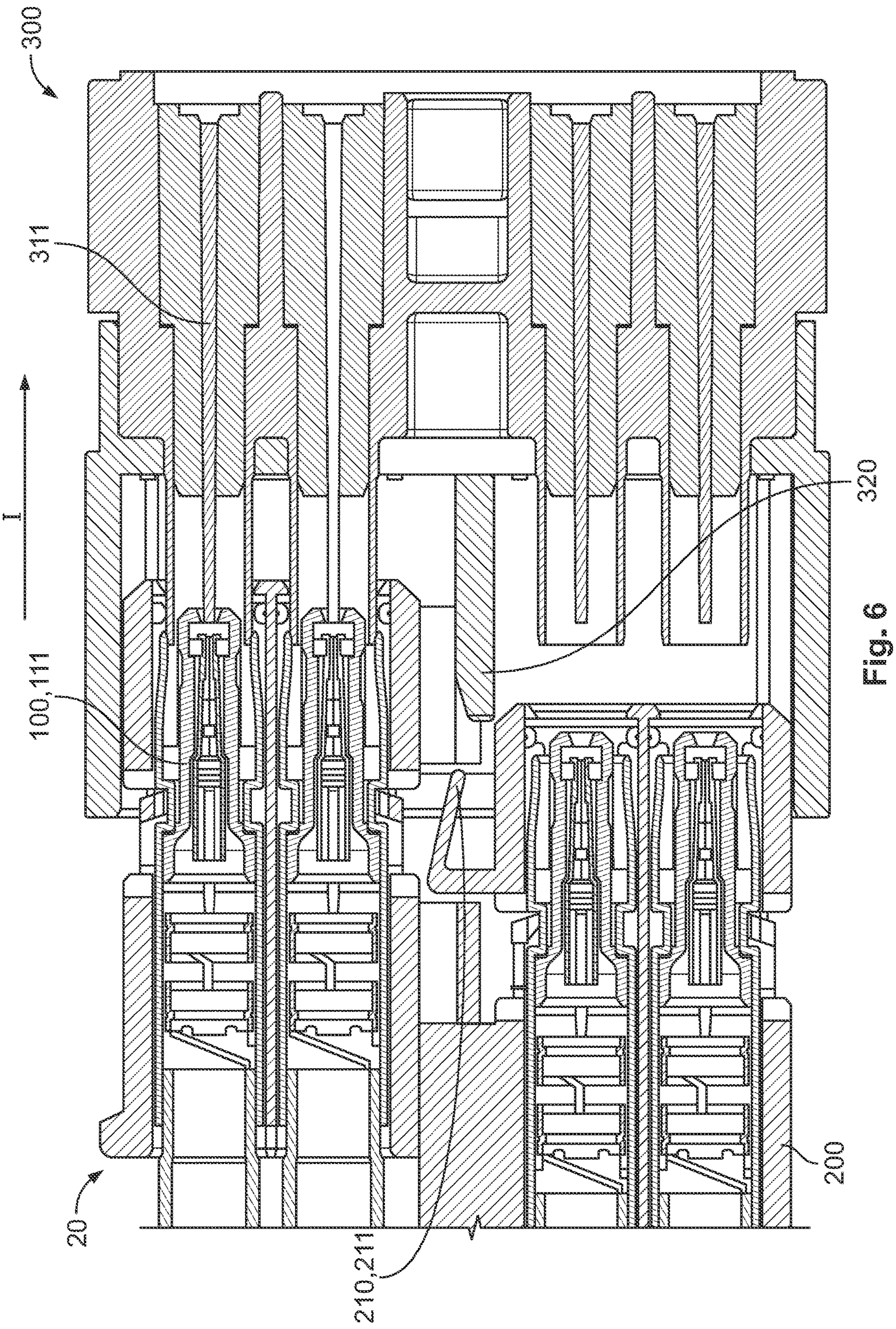
FIG. 6 is a cross-sectional view of the electrical connector partially engaged with the mating connector.

In the exemplary embodiment, the protrusion 320 has a tapered tip, and is adapted to act as a cam and engage with the latch 210 of the connector 20,200 during a mating operation. More specifically, referring generally to FIGS. 5-9, a staged or staggered engagement process between the connector 20 and the mating connector 300 is shown. FIG. 5 shows the connector 20 in the staggered initial position and aligned with the socket 310 of the mating connector 300. Referring to FIG. 6, the connector 20 has been initially inserted with the terminals 111 of the first housing 100 directly adjacent to the corresponding terminals 311 of the connector 300. As shown, the release element 320 is aligned to engage with the free end 211 of the latch 210, and the second housing 200 has initially entered the receiving space 310. With the latch 210 remaining in the locked position or state, the second housing 200 cannot be advanced relative to the first housing 100 in the insertion direction despite the application of an insertion force thereon by a user. As shown, the terminals 211 are prevented from engaging with the corresponding terminal 311 of the connector 300. More specifically, with the housings 100,200 locked in the staggered position, the terminals 111 and 211 are arranged in a sequential, or at least partially sequential, manner in the insertion direction (i.e., the terminals only partially overlap one another in the insertion direction).

Figure 7:
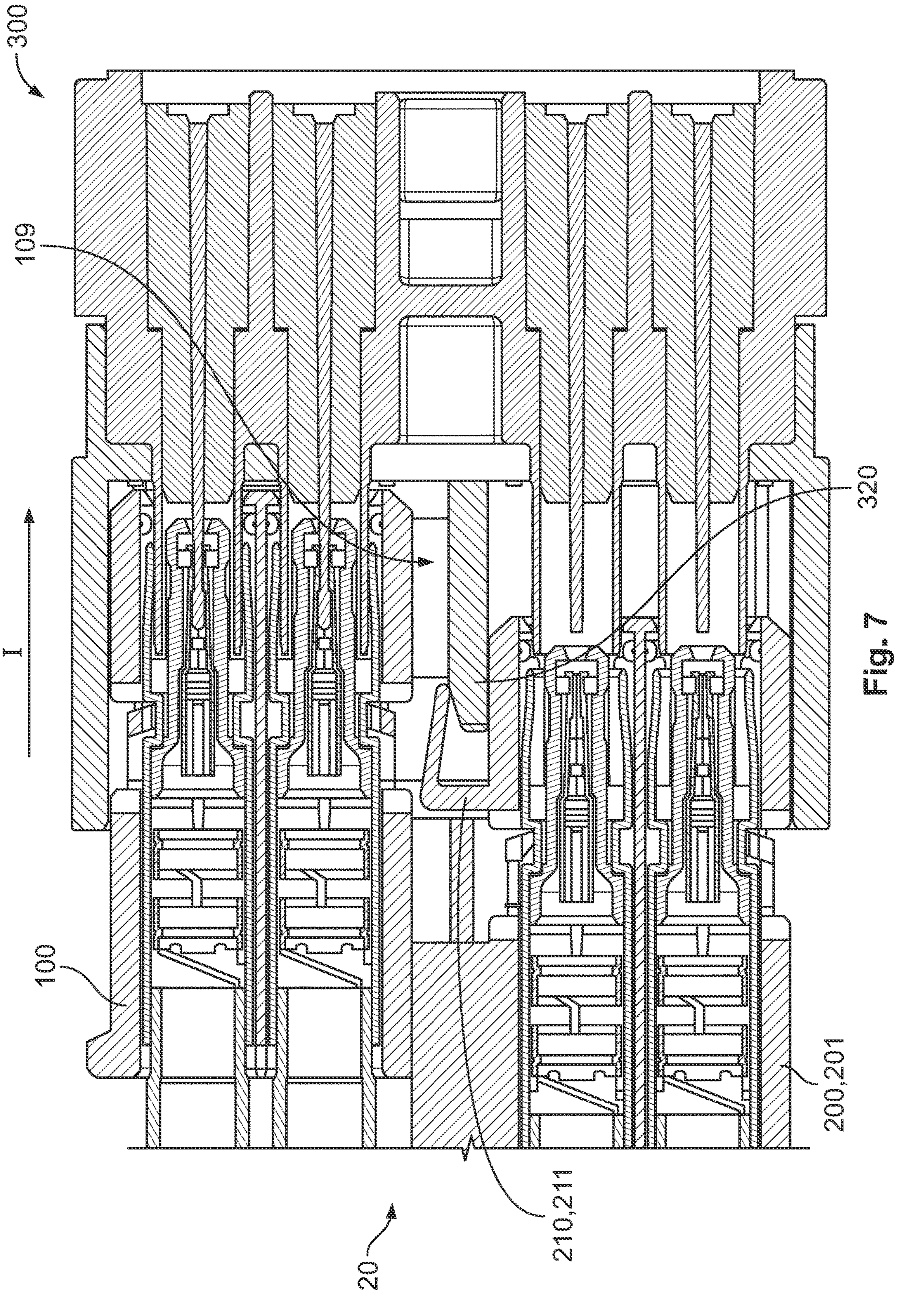
FIG. 7 is a cross-section view of the electrical connector with the first connector housing fully engaged with the mating connector.

Referring now to FIG. 7, as a result of further advancement of the connector 20 into the mating connector 300, the first housing 100 has reached a fully seated or installed position within the receiving space 310. The tapered end of the release element 320 has begun to engage with the latch 210, biasing it outward (or upward) from a remainder of the body 201 and into an unlocked position or state. Specifically, the latch 210 is biased into alignment with the slots 109 of the flanges 108 in the insertion direction I (see FIG. 1). Once aligned, the latch 210 will be free to pass through the body 101 of the first housing 100, thus permitting relative movement of the second housing 200 relative to the first housing 100 in the insertion direction I.

Figure 8:
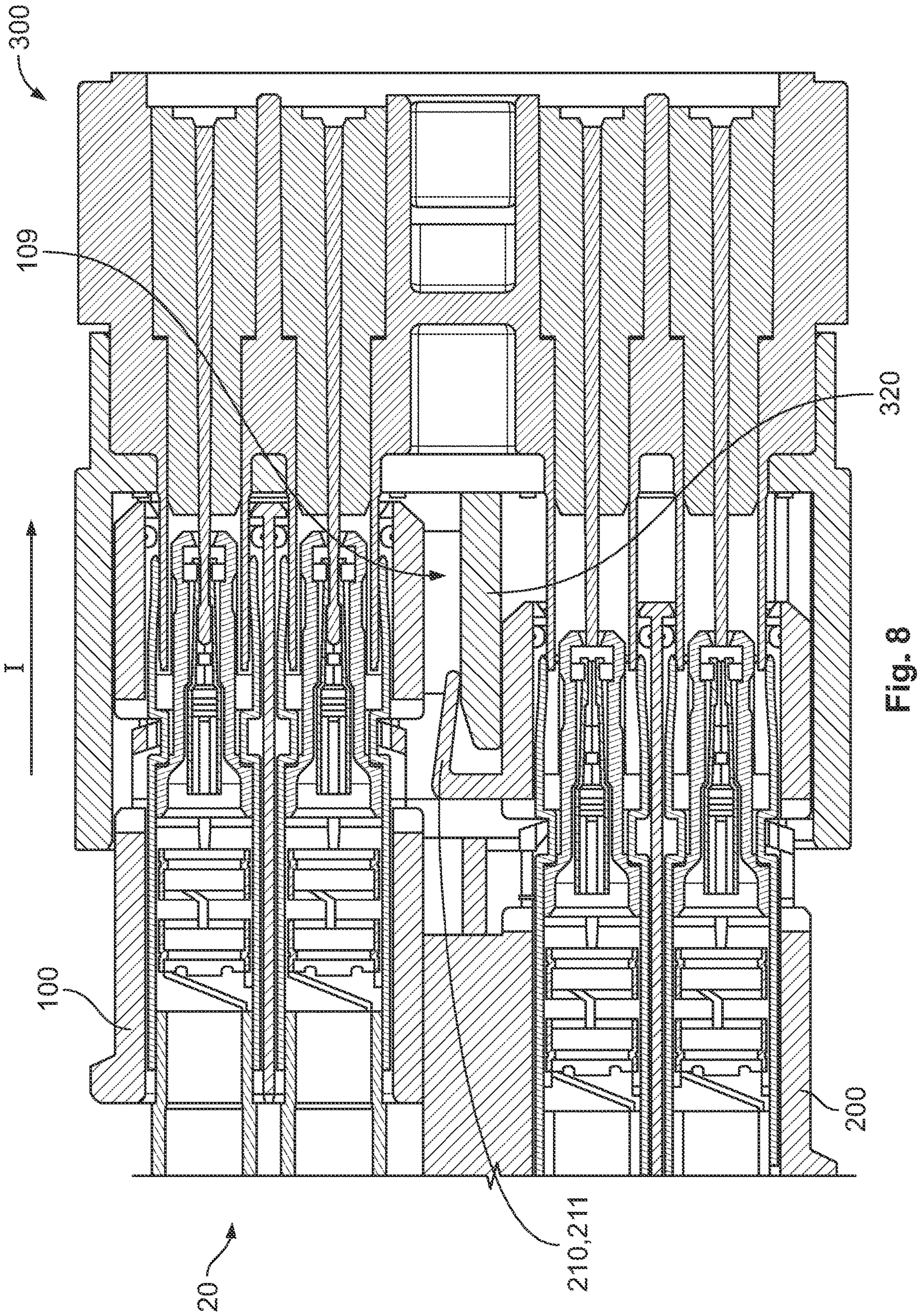
FIG. 8 is a cross-sectional of the electrical connector with the second connector housing released from a locked position and advancing into the mating connector relative to the first connector housing.
Figure 9:
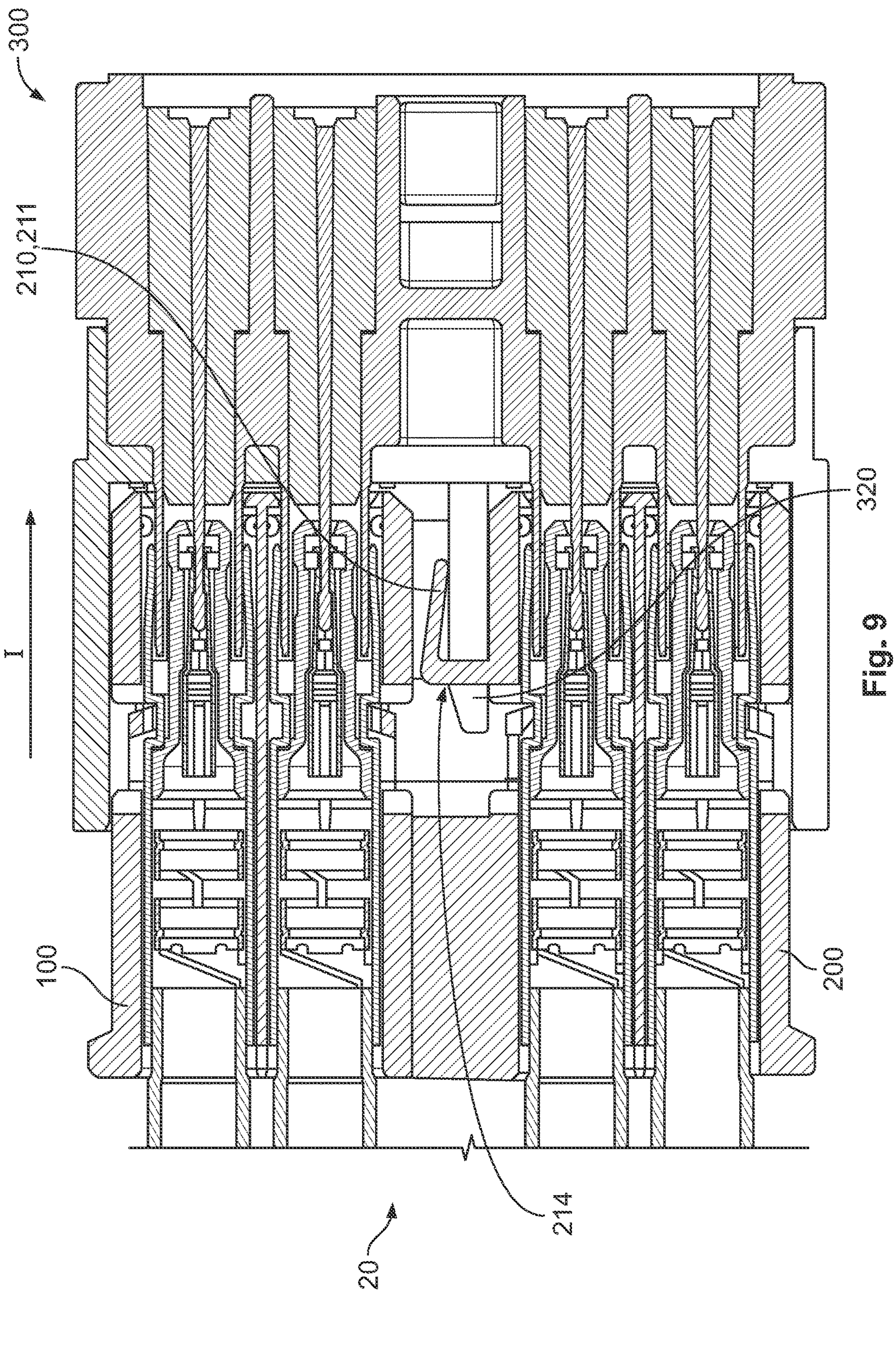
FIG. 9 is a cross-sectional view of the electrical connector with the first connector housing and the second connector housing fully engaged with the mating connector.

As shown in FIG. 8, with the latch 210 aligned with the slots 109, continued force on the second housing 200 in the insertion direction I will bias the unlocked, or unlatched, second housing further into the receiving space 310 of the mating connector 300. The terminals 211 are thus free to engage with the corresponding terminal 311 of the connector 300. Continued insertion force on the housing 200 will fully seat it with the connector 300, as shown in FIG. 9. As further illustrated, an end portion of the release element 320 has passed through the opening 214 in the latch 210, allowing the housing 200 to fully engage with the mating connector 300.

FIG. 10 illustrates a connector 20' according to another embodiment of the present disclosure. In the exemplary embodiment, the above-described complementary "T-Slot" guide channels and/or flanges have been replaced with a guide frame. Specifically, each of the first and second housings 100',200' include like-features to those described above, such as the releasable latch 210, flanges 108 and terminal connections (not shown). However, in the exemplary embodiment, the second housing 200' comprises a guide frame 250 defining a guide opening 252 through which the first housing 100' is permitted to slide in a guided manner. Similar to the above-described "T-Slot" arrangement, the guide opening 252 is sized such that relative motion between the housings 100',200' in radial directions is limited, or eliminated entirely. Like the embodiment of FIG. 1-9, the second housing 200' is permitted to move only in the insertion direction I of the connector 20' after the latch 210 thereof has been biased into an unlocked position by the mating connector 300. In other embodiments, the frame 250 may not fully encircle the housing 100', but rather, may only partially surround the housing 100' while still restricting its relative motion to that along the insertion direction I.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a first housing adapted to receive a plurality of first electrical terminals to be coupled to a mating connector in an insertion direction;

a second housing movably connected to the first housing and adapted to receive a plurality of second electrical terminals to be coupled with the corresponding mating connector in the insertion direction, the second housing selectively movable relative to the first housing in the insertion direction; and a latch selectively fixing the first housing in a staggered position relative to the second housing in the insertion direction, the latch defines an opening extending through the latch and receiving a portion of the mating connector.

2. The connector of claim 1, wherein the latch is movable between a locked state in which the first housing and the second housing are fixed relative to one another in the staggered position, and an unlocked state in which the first and second housings are movable relative to each other in the insertion direction.

3. The connector of claim 2, wherein the latch comprises an elastic arm having a fixed end attached to the second housing, and a free end engaging with the first housing in the locked state.

4. The connector of claim 3, wherein the free end of the elastic arm extends in the insertion direction and is adapted to engage with the mating connector as the second housing is mated with the mating connector.

5. The connector of claim 1, further comprising a guiding element operatively connected to at least one of the first or second housings and fixing the relative orientation of the first and second housings in a plurality of directions.

6. The connector of claim 5, wherein the guiding element permits relative motion between the first and second housings substantially only in the insertion direction.

7. The connector of claim 6, wherein the guiding element comprises a complementary tongue and groove formed on respective ones of the first and second housings.

8. The connector of claim 6, wherein the guiding element comprises a frame fixed to one of the first or second housings, the frame defining an opening through which the other one of the first or second housings is slidably received.

9. The connector of claim 1, wherein the first housing includes four first electrical terminals and the second housing includes four second electrical terminals.

10. The connector of claim 1, wherein:

the first housing is adapted to be coupled to the mating connector before the second housing is coupled to the mating connector, wherein the first electrical terminals engage with corresponding electrical terminals of the mating connector before the second electrical terminals engage with corresponding electrical terminals of the mating connector; and with the first housing coupled to the mating connector, the latch is adapted to be biased into an unlocked state.

11. The connector of claim 10, wherein the latch is adapted to be biased into the unlocked state by the mating connector.

12. A connector assembly, comprising:

a first connector, including:

a first housing adapted to receive a plurality of first electrical terminals to be coupled with a mating connector in an insertion direction;

a second housing adapted to receive a plurality of second electrical terminals to be coupled with the mating connector in the insertion direction, the second housing selectively movable relative to the first housing in the insertion direction; and a latch selectively fixing the position of the first housing relative to the second housing in the insertion direction, the latch defines an opening extending through the latch; and a second connector adapted to be coupled with the first connector and including a releasing element biasing the latch from a locked state to an unlocked state, the releasing element is received in the opening of the latch.

13. The assembly of claim 12, wherein:

in the locked state of the latch, the first housing and the second housing are fixed relative to one another in a staggered orientation in the insertion direction; and in the unlocked state of the latch, the first and second housings are movable relative to each other in the insertion direction.

14. The assembly of claim 13, wherein:

the first housing is adapted to be coupled to the mating connector before the second housing is coupled to the mating connector, wherein the first terminals engage with corresponding terminals of the mating connector before the second terminals engage with corresponding terminals of the mating connector; and with the first housing coupled to the mating connector, the latch is biased into the unlocked state.

15. The assembly of claim 14, wherein:

the latch comprises an elastic arm having a fixed end attached to the second housing, and a free end engaging with the first housing in the locked state; and the releasing element comprises a protrusion engaging with the free end of the elastic arm after the first housing is fully coupled with the mating connector.

16. The assembly of claim 12, wherein the first connector further comprises a guiding element operatively connected to at least one of the first or second housings and preventing relative movement between the first and second housings in a plurality of directions.

17. The assembly of claim 16, wherein the guiding element comprises a complementary tongue and groove formed on respective ones of the first and second housings and extending in the insertion direction.

18. The assembly of claim 16, wherein the guiding element comprises a frame fixed to one of the first or second housings, the frame defining an opening through which the other one of the first or second housings is slidably received.

19. The assembly of claim 12, wherein the first connector is received within a socket of the second connector and the releasing element is arranged within the socket.

* * * * *